US010933928B2

(12) United States Patent
    Thoonsen

(10) Patent No.: US 10,933,928 B2
(45) Date of Patent: Mar. 2, 2021

(54) SUPPORT DEVICE FOR TRACTOR, IN PARTICULAR OF AGRICULTURAL TYPE

(71) Applicant: ALTHIMASSE, Loudéac (FR)

(72) Inventor: Joseph Thoonsen, Loudéac (FR)

(73) Assignee: ALTHIMASSE

( * ) Notice: Subject to any disclaimer, the term of this patent is extended or adjusted under 35 U.S.C. 154(b) by 171 days.

(21) Appl. No.: 16/016,872

(22) Filed: Jun. 25, 2018

(65) Prior Publication Data
    US 2019/0002041 A1    Jan. 3, 2019

(30) Foreign Application Priority Data
    Jun. 30, 2017 (FR) ...................... 1756124

(51) Int. Cl.
    B62D 49/08    (2006.01)
    B62D 49/06    (2006.01)
    A01B 76/00    (2006.01)
    B60R 9/06     (2006.01)
    B60R 11/06    (2006.01)

(52) U.S. Cl.
    CPC ............ B62D 49/085 (2013.01); A01B 76/00 (2013.01); B60R 9/065 (2013.01); B60R 11/06 (2013.01); B62D 49/0628 (2013.01)

(58) Field of Classification Search
    CPC ... B62D 49/085; B62D 49/0628; B60R 11/06; B60R 9/065; A01B 76/00
    See application file for complete search history.

(56) References Cited

U.S. PATENT DOCUMENTS

| | | | | |
|---|---|---|---|---|
| 3,888,507 A | * | 6/1975 | Berghausen | B60D 1/02 280/759 |
| 4,249,684 A | * | 2/1981 | Miller | E05G 1/005 224/42.4 |
| 7,618,062 B2 | * | 11/2009 | Hamm | B62D 49/085 280/759 |
| 2005/0012314 A1 | * | 1/2005 | Kubo | B62D 49/085 280/757 |

(Continued)

FOREIGN PATENT DOCUMENTS

| | | | | |
|---|---|---|---|---|
| EP | 0 083 146 A2 | * | 7/1983 | ......... B62D 49/0628 |
| EP | 2 275 324 A1 | * | 1/2011 | ......... B62D 49/0626 |

(Continued)

OTHER PUBLICATIONS

Preliminary Search Report dated Mar. 15, 2018 in corresponding French Patent Application No. FR 1756124.

Primary Examiner — Frank B Vanaman
(74) Attorney, Agent, or Firm — Ostrolenk Faber LLP

(57) ABSTRACT

A support device, to be hooked up to a hitching device of a tractor: the support device includes a chassis 10 as a machine-welded metal structure which is fixed at 20 to the hitching device, and a platform extending cantilevered relative to the fixing device, the platform has an upper side 16 equipped at 160 to pre-position and center a box 40 to be supported on the platform, and a lower side 19 including at least one accommodating housing 191, 192 for cooperating with a corresponding protuberance 51, 52 of an add-on weight 50, intended to be supported under the platform to provide an anchoring in the shape of a "dovetail" type connection extending in the longitudinal direction substantially parallel to the direction of travel of the tractor.

10 Claims, 2 Drawing Sheets

(56) References Cited

U.S. PATENT DOCUMENTS

2017/0210432 A1* 7/2017 Cartechini ........... B62D 49/085
2017/0369110 A1* 12/2017 Thoonsen ................. B60R 9/06

FOREIGN PATENT DOCUMENTS

| EP | 2 380 804 A1 | 10/2011 |
| EP | 2 842 808 A1 | 3/2015 |
| FR | 2 953 478 A1 | 6/2011 |

* cited by examiner

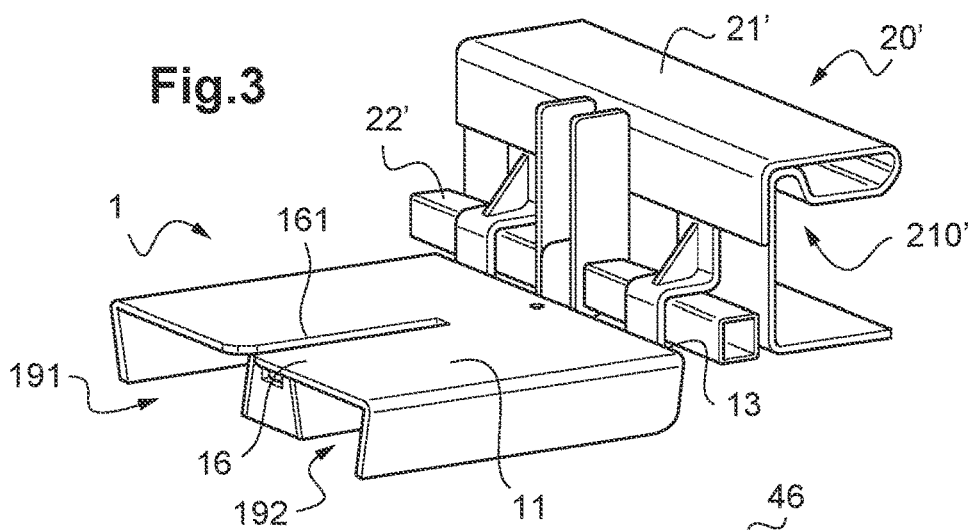
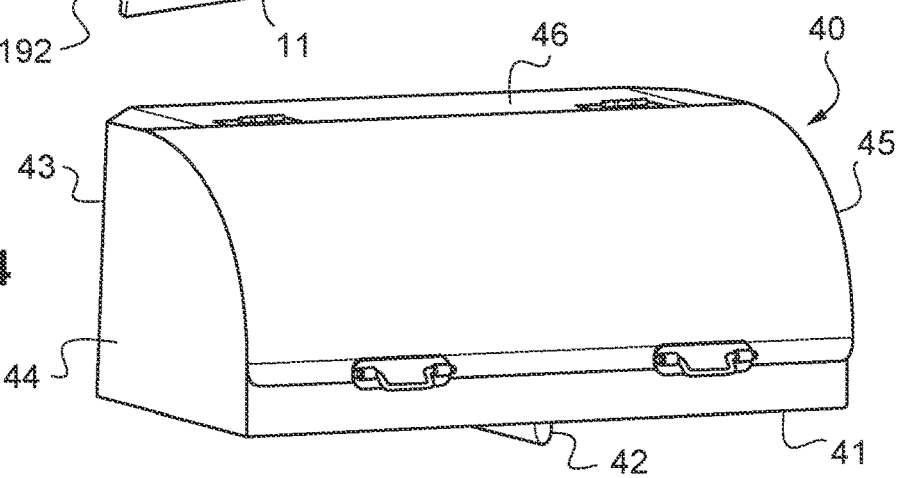
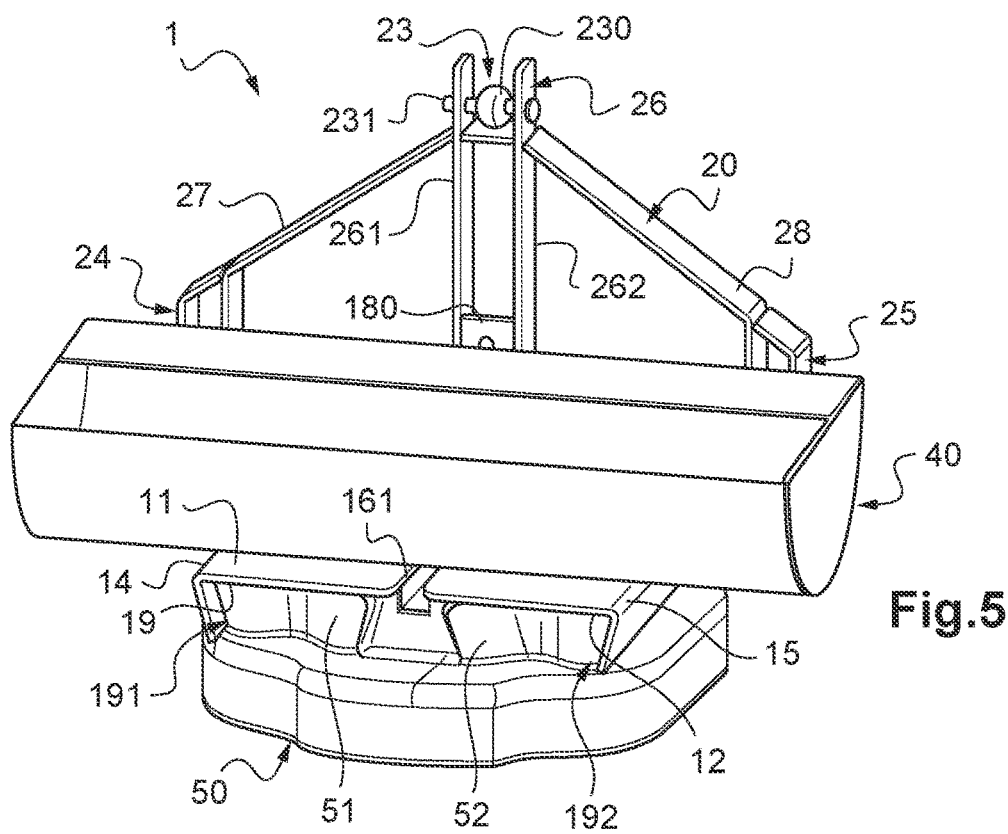

SUPPORT DEVICE FOR TRACTOR, IN PARTICULAR OF AGRICULTURAL TYPE

CROSS-REFERENCE TO A RELATED APPLICATION

The present application claims priority of French Patent Application No. 1756124, filed Jun. 30, 2017, the contents of which are incorporated by reference herein.

TECHNICAL FIELD

The invention relates to a support device suitable for cooperating with a front and/or rear hitching device of a tractor, in particular an agricultural tractor.

BACKGROUND OF THE INVENTION

Adding a ballasting and balancing system to a tractor is known, in particular to increase the weight of the tractor during operations requiring high traction forces. This ballasting system comprises ballast weights which are more often than not in a single integrally cast piece, intended to be hooked up to a hitching device of the tractor, of a front and/or rear lifting device type. Such a weight conventionally has an upper side, a lower side, two sides oriented transversely to the direction of travel of the tractor, and two lateral sides substantially parallel to the direction of travel, each lateral side including a transverse pin or bolt constituting a holding means for the lifting device of the tractor. This means typically consists of two lifting arms on either side of the weight, and provided at their ends with hooks supporting the weight via their transverse bolts. A means for hooking up a third hitching point can be provided on the upper side of the weight so as to prevent an oscillating movement around the lateral pins or bolts. Weights of this type are well known, in particular through the example of them provided by the system marketed under the brand name "Easymass®".

The transverse pins or bolts protrude on the lateral sides of the monobloc ballast weight and the means for hooking up a third hitching point constitute satisfactory holding means for handling and fixing the weight to the lifting device of the tractor. However, this system is not very advantageous since the use of these holding means require additional assembly operations for fixing these holding means to the weight body, which is an integrally cast piece. This increases the time and the overall cost of the process of making the ballast weight.

The lifting device of the tractor can also be used for transporting a box, in particular for providing a space allowing different tools to be carried on the tractor. In effect, sites are sometimes far from the holding, and it is therefore not always easy to have tools on hand to intervene on the equipment if necessary. A known solution from the Patent document FR2953478 consists in integrating a tool box in the cast iron block constituting the ballast weight. To do this, the ballast weight comprises a housing situated on the upper contour of the weight, which can potentially be covered by a lid. This housing thus makes it possible to equip agricultural tractors with an additional storage space able advantageously to accommodate different tools needed for agricultural work, for example, spanners, towing balls etc. However, this additional storage space has the disadvantage of only being able to provide a relatively small storage volume. Furthermore, the presence of the storage space involves arranging a cavity in the body of the ballast weight, to the detriment of its overall weight, which is not desirable. The lost weight can be compensated for by increasing the size of the ballast weight, this time to the detriment of compactness.

This solution furthermore proposes a storage volume made permanent by construction. Now, the needs in terms of additional storage space on the tractor and hence of a storage box can be extremely varied. Also, depending on the nature of the work to be carried out, the process of lifting the tractor can be used for hitching, by means of an appropriate support, a storage box, which can then be of any type in terms of dimensions, and the provision of an add-on weight involves uncoupling the storage box and hitching the add-on weight when lifting the tractor. In the event of frequent changes, all of these hitching/uncoupling operations of the storage box or of the add-on weight are nevertheless laborious.

In other words, depending on the needs and on the work to be carried out, a need exists to be able to hitch to tractor boxes of all types and in particular of varied dimensions, add-on ballast weights or a combination of these two types of equipment, without the aforementioned disadvantages.

The present invention aims to satisfy this need.

SUMMARY OF THE INVENTION

For this purpose, the present invention relates, according to a first one of its aspects, to a support device, intended to be hooked up to a hitching device, of a tractor lifting device or weight block type, for a tractor in particular of the agricultural type. The support device comprises a chassis which has a machine-welded metal structure comprising fixing means for fixing to the hitching device and a platform fixed to the fixing means, which extends cantilevered relative to the fixing means. The platform has an upper side including a means for pre-positioning and centering a box intended to be supported on said upper side of said platform. It has a lower side at which at least one housing is formed for accommodating an integrally cast add-on ballast weight intended to be supported at the lower side of the platform. The accommodating housing is suitable for cooperating with a corresponding protuberance of the add-on weight, to constitute an anchoring in the shape of a connection of the "dovetail" type, having a longitudinal direction substantially parallel to the direction of travel of the tractor.

According to an embodiment, the fixing means include three fixing points for connection to a three points type of lifting device equipping the tractor. The three fixing points are disposed as a triangle extending in a plane transverse to the direction of travel of the tractor.

Advantageously, the fixing means comprise a first and a second low fixing clevis, arranged laterally on either side of the platform. In the clevises the two fixing points constituting the base of the triangle are installed. A respective lifting arm is able to cooperate with the points so as to hitch the support device. The first and second low fixing clevises are linked with a third high fixing clevis, arranged at a position substantially median relative to the first and second fixing clevises and in which the third fixing point is installed, with which a retaining arm of the lifting device is able to cooperate.

The first and second fixing clevises preferably have at least two assembly positions of the fixing points in the vertical direction making it possible to modify the ground clearance of the chassis when the support device is hitched to the tractor.

According to another embodiment, the fixing means include a profile extending transversely to the direction of travel of the tractor and forming a female fixing imprint oriented towards the tractor when the support device is hitched to the tractor. The female fixing imprint is intended to cooperate with a male imprint of a weight block permanently fixed to the tractor for hooking up a ballast weight.

Advantageously, the pre-positioning and centering means comprise at least one groove made in the thickness of the platform. The groove is suitable for accommodating an assembly element protruding from one side of a bottom panel of the box, which side is intended to face the upper side of the platform. The assembly element is inserted in the groove to allow the box to be positioned on the upper side of the platform.

The groove preferably extends in a direction substantially parallel to the direction of travel of the tractor. The groove exits at a side of the platform oriented substantially transversely to the direction of travel of the tractor, which side is situated away from the tractor relative to the platform when the support device is fixed to the tractor.

Advantageously, the assembly element includes a rib having a dovetail cross section in the plane transverse to the direction of travel of the tractor and the dovetail cross section is accommodated inside the groove provided in the platform.

The invention also relates to a box, such as a tool box in particular, that is suitable for being supported on a support device as described above. That box comprises a bottom panel suitable for being supported, surface mounted, against the upper side of the platform. At least one assembly element integral with the bottom panel of the box and able to cooperate with the pre-positioning and centering means arranged on the upper side of the platform.

The invention also relates to a ballast device for a tractor, particularly an agricultural tractor, comprising a support device as described above and a box as described above, supported on said support device.

BRIEF DESCRIPTION OF THE DRAWINGS

Other characteristics and advantages of the invention will emerge clearly from the description that is made of it below of a particular embodiment of the invention but, not limited to it, with reference to the following figures, among which:

FIG. 3 illustrates a diagrammatic side view, in perspective, of the support device according to a third embodiment of the invention;

FIG. 4 illustrates a diagrammatic front view, in perspective, of an example of a box intended to be supported on the support device of the invention;

FIG. 5 illustrates a diagrammatic front view, in perspective, of the support device according to the invention, able to be used as a ballast device for the tractor, with an add-on weight carried by the underside of the support device and a box, such as that illustrated on FIG. 4, supported on the upper side.

DESCRIPTION OF PREFERRED EMBODIMENTS

In the following description, identical or similar elements illustrated in the Figures are designated by the same reference signs and will not systematically be described again.

The support device 1 illustrated in the Figures is intended to be hooked onto the front or rear of a tractor, particularly of an agricultural type, via a hitching device equipping the tractor, particularly of a front or rear lifting device type, or of a front or rear weight block type.

Figure 1:
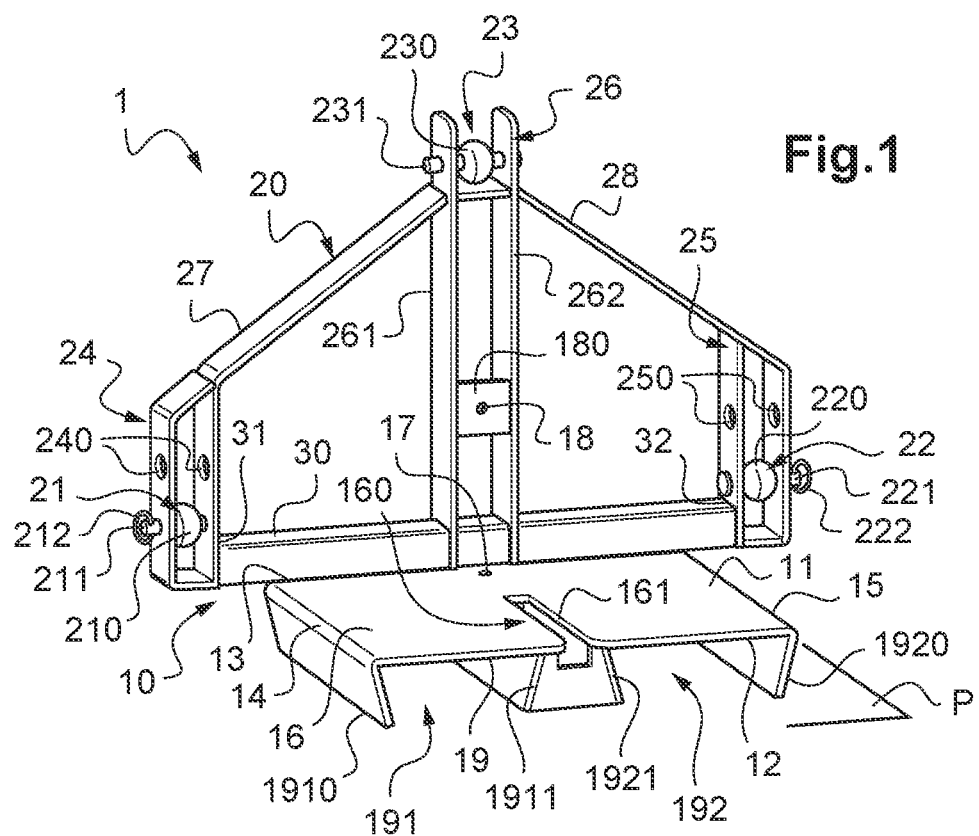
FIG. 1 illustrates a diagrammatic front view, in perspective, of the support device according to a first embodiment of the invention.

The support device 1 shown in FIG. 1 comprises a chassis 10 having a machine-welded metal structure. The machine-welded structure of the chassis 10 comprises a first metal structural element 11 forming a platform extending in a plane P. This platform 11 is delimited by a front edge 12 and a rear edge 13 opposite the front edge 12, and by a first lateral edge 14 and a second lateral edge 15 opposite the first lateral edge 14. The "front" and "rear" sides are used here in relation to an embodiment where the support device is hooked onto the front of the tractor. It is understood that in the case where the support device is hooked into the rear of the tractor, the notions "front" or "rear" are reversed so as to understand the true orientation (the front becomes the rear and vice versa).

The machine-welded structure of the chassis 10 also comprises a second metal structural element 20 forming means for being fixed to the hitching device of the tractor, which are fixed to an intermediate element 30 extending substantially along the rear edge 13 of the platform 11. The intermediate element 30 comprises a metal beam having respective ends 31 and 32 that protrude at either side of the platform 11, respectively towards the first lateral edge 14 and the second lateral edge 15.

The embodiment of FIG. 1 relates to a support device intended to be hooked onto a three points type of lifting device with which the tractor is equipped. The fixing device 20 therefore includes three fixing points 21, 22 and 23 in a triangular array for ensuring the connection with a three points type of lifting device. The three fixing points are disposed as a triangle extending in a plane transverse to the direction of travel of the tractor. This transverse plane is perpendicular to a plane P defined by the platform 11. In this arrangement, the platform 11 therefore protrudes forward of and outside the perpendicularity of the fixing device 20 for fixing to the lifting device of the tractor.

More precisely, the fixing means in triangular array 20 comprises a first and a second fixing clevis 24 and 25, welded respectively at the respective ends 31 and 32 of the metal beam 30. From those ends, the two devises extend perpendicularly upwards, and the two fixing points 21 and 22 are respectively installed. This constitutes the base of the triangle for fixing to the lifting device of the tractor. Respective lifting arms of the lifting device of the tractor are intended to cooperate respectively with the fixing points 21 and 22 assembled in the respective fixing devises 210 and 220.

The two fixing points 21 and 22 each comprise a hitching ball, respectively 210 and 220, assembled on a central part of a respective transverse bolt 211, 221 assembled in the corresponding fixing clevis, respectively 24 and 25. The hitching balls 210 and 220 may have a spherical or toroidal contour.

The first and second fixing clevises 24 and 25 preferably have several, at least two, assembly positions of the fixing points 21 and 22 in the vertical direction, so as to be able to easily modify the ground clearance of the support device when it is hitched to the tractor.

Each fixing clevis 24, 25 has for example two assembly positions of the transverse bolts 211, 221 in the vertical direction, so as to define two positions in height of the support device 1 and in particular of the platform 11, relative to the tractor, one high position and one low position. It is thus possible to adjust the ground clearance of the support device via the positioning the height of these transverse bolts 211, 221 in their respective fixing clevises 24, 25. Each assembly position of a transverse bolt 211, respectively 221, on its fixing clevis 24, respectively 25, is defined by a pair of bores 240, respectively 250, situated facing each other on the opposite panels of the fixing clevis, between which panels the transverse bolt is assembled. An end portion of each transverse bolt furthermore exits on the outside of the fixing clevis. This exiting end portion is for example blocked by a pin 212, 222 enabling easy assembly and disassembly of the transverse bolt for positioning it in height in the fixing clevis.

A third fixing clevis 26, intended to accommodate the third fixing point 23, which constitutes the apex of the fixing triangle, is arranged in a substantially median position relative to the first and second fixing clevises 24 and 25, in which the two fixing points 21 and 22 constituting the base of the fixing triangle are assembled. This third fixing clevis 26 is called high, relative to the other two fixing clevises 24 and 25, called low. This third fixing clevis 26 is formed at the upper part from a first and a second vertical plate 261, 262, substantially parallel to the direction of travel of the tractor, which extend perpendicularly from a median part of the metal beam 30, with which they are integrally assembled. In other words, these two vertical plates 261, 262, facing each other, extend perpendicularly to the metal beam 30 at a median part of the rear edge 13 of the platform 11.

The arrangement of the third fixing point 23 in the fixing clevis 26 is similar to that of the first and second fixing points. The third fixing point 23 thus also comprises a hitching ball 230, assembled on a central part of a transversal bolt 231 assembled in the fixing clevis 26. In the same way as explained previously in relation to the first and second fixing clevises 24 and 25, the third fixing clevis 26 can have several assembly positions of the fixing points 21 and 22 in the vertical direction.

The two low fixing clevises 24 and 25 are linked with the high fixing clevis 26 by means of two stiffening crosspieces 27 and 28, extending substantially obliquely, fixed respectively between the first low fixing clevis 24 and the upper part of the first vertical plate 261 and between the second low fixing clevis 25 and the upper part of the second vertical plate 262.

The third fixing point 23 constitutes an additional hooking means intended to cooperate with a high retaining arm of the lifting device of the tractor, in particular so as to prevent the support device from swinging around the transversal bolts 211 and 221 of the first and second fixing points 21 and 22.

Furthermore, the platform 11 has an upper side 16 on which a box is intended to be supported, such as a box 40 shown in FIG. 4. The box 40 is for example made in a machine-welded manner and includes a bottom panel 41 intended to bear against the upper side 16 of the platform 11. It also comprises a rear panel 43 extending substantially vertically to the bottom panel, between two lateral panels 44, 45.

The platform is arranged so as to obtain a means 160 in the platform 11 for pre-positioning and centering the box 40 intended to be supported on its upper side 16. This pre-positioning and centering means 160 comprises, according to the embodiment example, a recess preferably shaped as a rectangular groove 161, made through the upper side 16 of the platform 11. The groove 161 preferably extends along a median axis of the platform 11 in a direction substantially parallel to the direction of travel of the tractor and exits at the front side 12 of the platform 11. The groove 161 is shaped to accommodate a corresponding rib 42, arranged along a median axis of the side of the bottom panel 41 of the box that faces the upper side 16 of the platform 11, such that the rib 42 inserted in the groove 161 allows correct positioning of the box 40 on the upper side 16 of the platform 11. In this insertion position, the rib 42 accommodated in the groove 161 abuts therein, which makes it possible to fix the box 40 on the upper side 16 of the platform 11 in a predetermined position when it is supported thereon. In this position, the rear panel 43 of the box 40 is intended substantially to bear against at least a portion of the first and second vertical plates 261 and 262 extending vertically at a median part of the rear edge of the platform 11. Depending on the varied dimensions of the box that can be supported on the platform 11, the rear panel 43 of the box 40 can also substantially bear against at least a portion of the first and second fixing devises 24 and 25 arranged vertically on either side of the platform 11.

The rib 42 protruding from the bottom panel 41 of the box 40 can have, for example, a V cross section in the plane transverse to the direction of travel of the tractor, allowing an easy fit in the rectangular groove 161 of the platform.

The rib 42 protruding from the bottom panel 41 of the box 40 preferably has a dovetail cross section in the plane transversal to the direction of travel of the tractor, progressively widening from the bottom panel of the box. Thus, once inserted in the opening of the groove 161 through the front side 12 of the platform 11, the rib 42 is suitable for sliding in the groove 161 and is blocked in a vertical direction substantially perpendicular to the upper side 16 of the platform 11, making it possible to ensure the assembly of the box 40 on the platform 11. The cooperation between the dovetail rib 42 arranged on the bottom panel 41 of the box 40 intended to be supported on the upper side 16 of the platform 11 and the groove 161 through the platform 11 allows any type of box to be accepted on the platform.

Furthermore, the machine-welded chassis 10 constituting the support device 1 of the invention includes fixing orifices 17, 18, which are provided to accommodate fixing screws (not illustrated) for cooperating with panels of the supported box so as to fasten it to the machine-welded chassis 10. Preferably provided are a first fixing orifice 17, arranged at the platform 11, for example at its rear part, and a second fixing orifice 18, arranged at a fixing plate 180 fixed between the first and second vertical plates 261 and 262. According to this arrangement, the bottom panel 41 and the rear panel 43 of the box 40 include corresponding fixing orifices for passing fixing screws intended to penetrate the fixing orifices 17 and 18 provided respectively on the platform 11 and the fixing plate 180 of the machine-welded chassis 10. When the box 40 supported on the upper side of the platform 11 is positioned in the predetermined position via the pre-positioning and centering means 160, the orifices made on the bottom and rear panels of the box 40 are aligned with the fixing orifices 17 and 18 arranged on the platform 11 and the fixing plate 180 of the machine-welded chassis 10.

Furthermore, according to the invention, and as illustrated on FIG. 5, the machine-welded chassis 10 is designed to make it possible to support, in a lower part of the platform 11, an add-on weight 50, called a monobloc, in a single piece, for example in cast iron, integrally cast. The weight of the basic weight can be variable depending on the needs and can be for example 600 or 900 kg. Thus, with such a weight carried by the underside of the machine-welded chassis 10, the support device 1 of the invention allows the front or the rear of the tractor to be ballasted according to the needs when it is hitched thereto.

For this purpose, the platform 11 of the machine-welded chassis 10 has, on its underside 19, two housings 191, 192 as female dovetails, extending along the direction of travel of the tractor, on either side of the rectangular groove 161 made in the median axis of the platform 11. Each female dovetail housing 191, 192 is shaped by two flat plates facing each other, welded under the platform 11, respectively an end flat plate 1910, 1920 welded at the lateral edges 14, of the platform and a substantially median flat plate 1911, 1921 welded in a zone substantially close to the groove 161 of the platform. The end flat plates, respectively 1910 and 1920 and the substantially median flat plates, respectively 1911 and 1921 extend under the platform to define between them a free space constituting the corresponding female dovetail housing.

The female dovetail housings 191 and 192 are provided to cooperate with two corresponding protuberances 51, 52 as male dovetails, arranged at the upper part of the add-on weight 50. The housings 191 and 192 have exits on the front side of the support device, such that the protuberances 51, 52 are inserted in the housings 191, 192 through the front side of the support device 1, then the add-on weight is moved rearwards. At the rear, the housings 191, 192 can have exits or not. The housings 191, 192 shaped as female dovetails, arranged at the lower part of the platform 11, thus allow the assembly by interlocking of an add-on ballast weight 50 along an interlocking direction substantially parallel to the direction of travel of the tractor.

Figure 2:
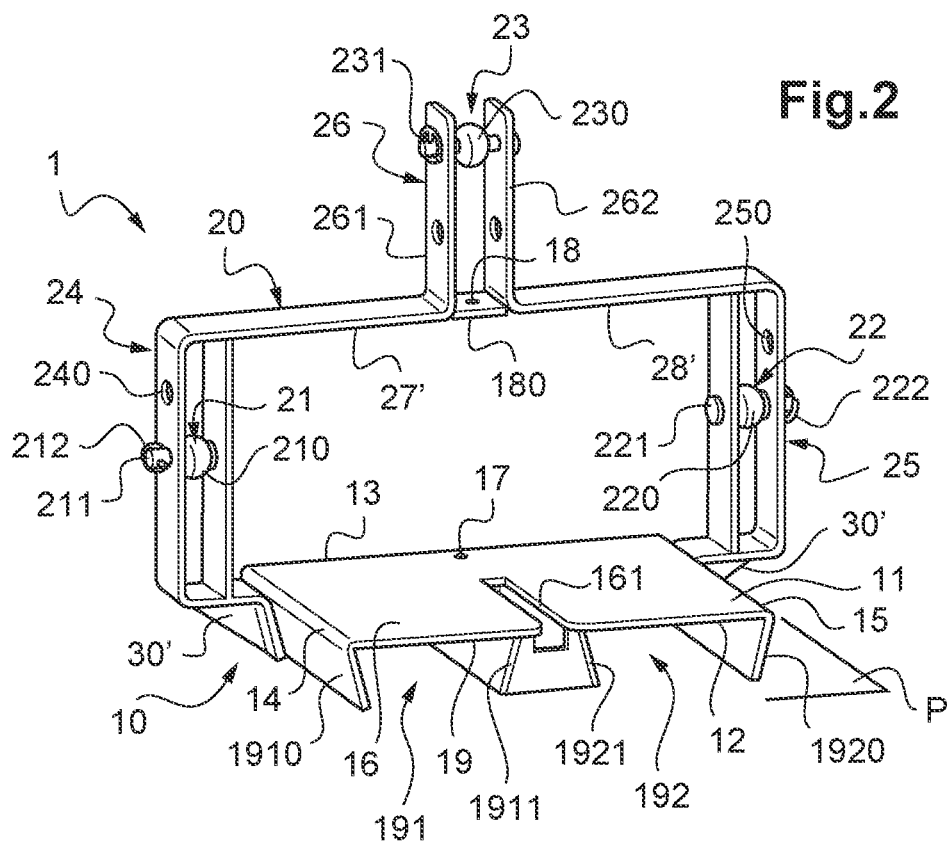
FIG. 2 illustrates a diagrammatic front view, in perspective, of the support device according to a second embodiment of the invention.

FIG. 2 illustrates an embodiment variant of the means for fixing to the three points lifting device of the tractor. According to this embodiment variant, the low fixing clevises 24, 25 intended to cooperate with the two lifting arms of the lifting device of the tractor are fixed directly to either side of the platform 11, without the presence of the intermediate element consisting of the metal beam 30. More precisely, the fixing clevises 24 and 25 are fixed on a respective side of the platform 11, at the rear part thereof, delimited by the rear edge 13 of the platform 11, via a fixing element 30'. This fixing element 30' has a first part fixed to the outer side of a respective flat end plate 1910, 1920 delimiting a respective side of the platform 11, and a second part from which the corresponding low fixing clevis 24, 25 extends vertically upwards. Two stiffening crosspieces 27', 28' extend parallel to the plane P towards the median axis of the platform 11 from an upper part of the low fixing clevises 24 and 25, opposite the fixing element 30' so as to form, with the inner sides 242, 252 facing each other of the fixing clevises 24 and 25, a frame, which extends in a plane perpendicular to the plane P (namely transversal to the direction of travel of the tractor). The respective facing ends of the two stiffening crosspieces 27' and 28', situated opposite the low fixing clevises 24 and 25, are linked with the first and second vertical plates 261 and 262 forming the third fixing clevis 26, which protrudes upwards relative to the frame in a substantially median position relative to the first and second fixing clevises 24 and 25.

According to this embodiment variant, when a box like the box 40 illustrated on FIG. 4 is supported on the upper side 16 of the platform 11, the rear part of this box is intended to be accommodated in the frame formed by the horizontal crosspieces 27' and 28' and the vertical fixing clevises 24 and 25. In other words, a respective rear part of the lateral sides 44 and 45 of the box is disposed directly adjacent to the respective inner sides 242, 252 of the low fixing clevises 24 and 25 and a rear upper edge 46 of the box is disposed directly subjacent to the inner side of the crosspieces 27', 28', namely the side of these crosspieces facing the platform 11. The fixing plate 180 accommodating the second fixing orifice 18 for fixing the box is oriented parallel to the rear upper edge 46 of the box, between the two vertical plates 261, 262.

FIG. 3 illustrates an embodiment variant, which relates to the case where the support device 1 is intended to be hooked to a weight block of the tractor, the variant being intended for hooking on a ballast weight, this weight block constitutes an alternative to the lifting device evoked previously for tractors that are not equipped with such a device. Also, in this embodiment variant, the second metal structural element 20' of the machine-welded structure of the chassis forming the means of fixing to the tractor hitching device of the weight block type, comprises a profile 21' extending transversally to the direction of travel of the tractor, along the rear edge 13 of the platform 11. This profile 21' is for example fixed to the platform 11 via a beam 22' welded to the rear edge 13 of the platform 11, with which it is integrated. The profile 21' defines a female fixing imprint 210', which is oriented towards the tractor when said support device 1 is hitched to the tractor. This female imprint 210' is suitable for cooperating with a corresponding male imprint of the weight block fixed to the tractor, the cooperation of the male and female imprints ensuring that the support device 1 is hooked to the weight block equipping the tractor.

The invention claimed is:

1. A support device configured to be hooked up to a hitching device of a tractor lifting device for a tractor having a direction of travel, the support device comprising:
   a chassis comprising a machine-welded metal structure comprising:
   a fixing device for fixing the support device to the hitching device;
   a platform fixed to the fixing device, the platform extends from and is cantilevered relative to the fixing device;
   the platform having an upper side including a pre-positioning and centering device configured for pre-positioning and centering a box configured to be supported on the upper side of the platform;
   the platform having a lower side comprising at least one accommodating housing configured for accommodating an add-on ballast weight that is configured to be supported at the lower side of the platform; and
   the accommodating housing being configured for cooperating with a protuberance of the add-on weight, to define an anchoring having a longitudinal direction that is substantially parallel to the direction of travel of the tractor.

2. A device according to claim 1, wherein:
   the fixing device includes three fixing points for connection to a three points lifting device equipping the tractor,
   wherein the three fixing points of the fixing device are disposed as a triangle extending in a plane transverse to the direction of travel of the tractor.

3. A device according to claim 2, wherein the fixing device comprises:
   a first and a second low fixing clevis, arranged laterally, respectively, on either side of the platform, the two fixing points comprising a base of the triangle and the first and second fixing points are installed in the devises;
   the fixing points configured to cooperate with respective lifting arms so as to hitch the support device; and the first and second low fixing devises are linked with a third high fixing clevis, the third high fixing clevis is arranged at a position substantially median relative to the first and second fixing devises, and the third fixing point is installed at the median and, wherein the third clevis is configured to cooperate with a retaining arm of the lifting device.

4. A device according to claim 3, wherein the first and second fixing devises have at least two assembly positions of the fixing points in a vertical direction for enabling modifying the ground clearance of the chassis when the support device is hitched to the tractor.

5. A device according to claim 1, wherein:

the fixing device is configured for a ballast hook up weight block permanently fixed to the tractor and includes a profile extending transversely to the direction of travel of the tractor and forming a female fixing imprint oriented towards the tractor when the support device is hitched to the tractor; and the female fixing imprint being configured to cooperate with a male imprint of the ballast hook up weight block.

6. A device according to claim 1, wherein the pre-positioning and centering device comprises at least one groove in a thickness direction of the platform, the groove being configured for accommodating an assembly element protruding from one side of a bottom panel of the box, the one side of the box intended to face the upper side of the platform, wherein the assembly element is configured for insertion in the groove for allowing the box to be positioned on the upper side of the platform.

7. A device according to claim 6, wherein the groove extends in a direction substantially parallel to the direction of travel of the tractor, and the groove exits at a side of the platform oriented substantially transversely to the direction of travel of the tractor, wherein a side situated away from the tractor relative to the platform when the support device is fixed to the tractor.

8. A device according to claim 6, wherein the assembly element includes a rib having a dovetail cross section in a plane transverse to the direction of travel of the tractor, and the dovetail cross section is configured to be accommodated inside the groove provided in the platform.

9. A tool box configured for being supported on a support device according to claim 1, the tool box comprising:

a bottom panel configured for being supported, surface mounted, against the upper side of the platform and at least one assembly element integral with the bottom panel of the box, and configured to cooperate with the pre-positioning and centering device arranged on the upper side of the platform.

10. A ballast device for the tractor, the ballast device comprising a support device according to claim 1, and a box, supported on the support device.

* * * * *